(12) United States Patent
St. Clair

(10) Patent No.: US 10,353,477 B2
(45) Date of Patent: Jul. 16, 2019

(54) CUSTOM GESTURES

(71) Applicant: Facebook, Inc., Menlo Park, CA (US)

(72) Inventor: Luke St. Clair, Corte Madera, CA (US)

(73) Assignee: Facebook, Inc., Menlo Park, CA (US)

( * ) Notice: Subject to any disclaimer, the term of this patent is extended or adjusted under 35 U.S.C. 154(b) by 155 days.

(21) Appl. No.: 15/398,629

(22) Filed: Jan. 4, 2017

(65) Prior Publication Data

US 2017/0115874 A1  Apr. 27, 2017

Related U.S. Application Data

(63) Continuation of application No. 13/557,945, filed on Jul. 25, 2012, now Pat. No. 9,619,037.

(51) Int. Cl.
*G06F 3/048* (2013.01)
*G06F 3/01* (2006.01)
*G06F 3/0488* (2013.01)
*G06Q 50/00* (2012.01)
*G06F 3/0484* (2013.01)

(52) U.S. Cl.
CPC ............ *G06F 3/017* (2013.01); *G06F 3/0488* (2013.01); *G06F 3/04847* (2013.01); *G06F 3/04883* (2013.01); *G06Q 50/01* (2013.01)

(58) Field of Classification Search
CPC ............... G06Q 50/01; G06Q 30/0269; G06Q 30/0201; G06F 3/017; G06F 3/04847; G06F 3/0488; G06F 3/04883
See application file for complete search history.

(56) References Cited

U.S. PATENT DOCUMENTS

| | | | |
|---|---|---|---|
| 2009/0265242 A1* | 10/2009 | Horvitz | G06Q 30/02 705/14.52 |
| 2010/0251177 A1* | 9/2010 | Geppert | G06F 3/04817 715/821 |
| 2011/0066984 A1* | 3/2011 | Li | G06F 3/04883 715/863 |
| 2011/0187497 A1* | 8/2011 | Chin | G06F 21/00 340/5.54 |
| 2011/0208814 A1* | 8/2011 | Bostrom | G06Q 10/10 709/204 |
| 2011/0252032 A1* | 10/2011 | Fitzgerald | H04L 63/20 707/737 |
| 2011/0302509 A1* | 12/2011 | Leacock | G06Q 10/10 715/756 |
| 2011/0307551 A1* | 12/2011 | Danezis | G06F 17/30522 709/204 |
| 2012/0049787 A1* | 3/2012 | Kuroiwa | B60L 3/0092 320/106 |

(Continued)

Primary Examiner — Tadesse Hailu
(74) Attorney, Agent, or Firm — Baker Botts L.L.P.

(57) ABSTRACT

In one embodiment, a method includes accessing a social graph that includes user nodes and edges connecting the user nodes; identifying, based on the social graph, a set of second users corresponding to second-user nodes that are within a specified social degree of separation from a first-user node corresponding to a first user; determining, based on the social graph, that a particular feature is enabled on computing devices associated with at least a threshold number of the identified set of second users; and enabling the particular feature on a computing device associated with the first user.

20 Claims, 14 Drawing Sheets

(56) References Cited

U.S. PATENT DOCUMENTS

| | | | |
|---|---|---|---|
| 2012/0304106 A1* | 11/2012 | LeVee | G06F 3/0481 |
| | | | 715/781 |
| 2013/0054695 A1* | 2/2013 | Holman | G09B 19/00 |
| | | | 709/204 |
| 2013/0120279 A1* | 5/2013 | Plichta | G06F 3/04883 |
| | | | 345/173 |
| 2013/0185131 A1* | 7/2013 | Sinha | G06Q 30/0226 |
| | | | 705/14.27 |
| 2013/0227418 A1* | 8/2013 | Sa | G06F 3/0488 |
| | | | 715/728 |
| 2013/0298038 A1* | 11/2013 | Spivack | H04L 65/403 |
| | | | 715/753 |
| 2014/0006954 A1* | 1/2014 | Raffa | G06F 3/04883 |
| | | | 715/733 |

* cited by examiner

CUSTOM GESTURES

PRIORITY

This application is a continuation under 35 U.S.C. § 120 of U.S. patent application Ser. No. 13/557,945, filed 25 Jul. 2012.

TECHNICAL FIELD

This disclosure generally relates to touch input.

BACKGROUND

A touch screen is an electronic visual display that detects the presence and location of user touch inputs. Mobile devices (such as a mobile phone, a tablet computer, and a laptop computer) often incorporate a touch screen to facilitate user interactions with application programs running on the mobile device.

DESCRIPTION OF EXAMPLE EMBODIMENTS

A touchpad is an input device including a surface that detects touch-based inputs of users. Similarly, a touch screen is an electronic visual display surface that detects the presence and location of user touch inputs. So-called dual touch or multi-touch displays or touchpads refer to devices that can identify the presence, location and movement of more than one touch input, such as two- or three-finger touches. A system incorporating one or more touch-based input devices may monitor one or more touch-sensitive surfaces for touch or near touch inputs from a user. When one or more such user inputs occur, the system may determine the distinct area(s) of contact and identify the nature of the touch or near touch input(s) via geometric features and geometric arrangements (e.g., location, movement), and determine if they correspond to various touch events or gestures (e.g., tap, drag, swipe, pinch).

Figure 1:
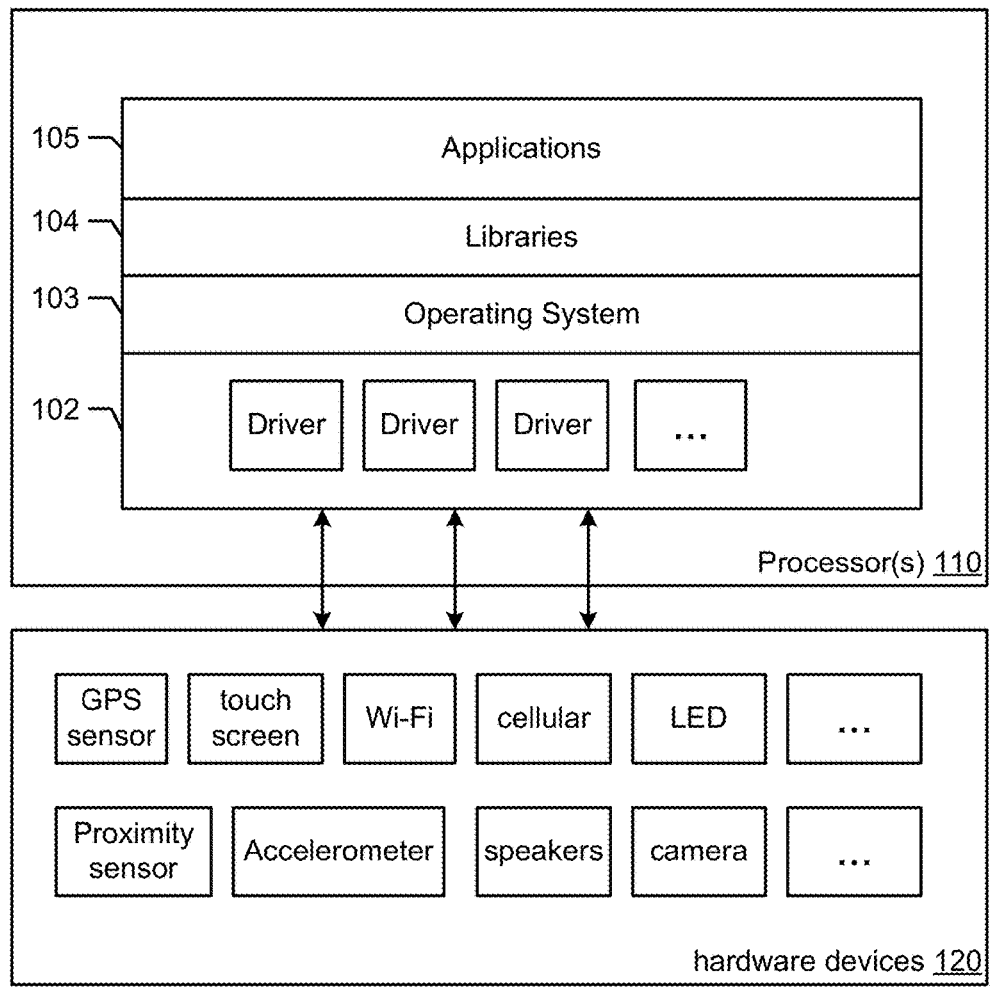
FIG. 1 illustrates an example processing stack of a mobile device

Recognition of touch events by a system with one or more touch-based input Devices—i.e., identifying one or more touch inputs by a user and determining corresponding touch event(s)—may be implemented by a combination of hardware, software, or firmware (or device drivers). FIG. 1 illustrates an example processing stack of a mobile device (e.g., a smart phone, a tablet computer). In the example of FIG. 1, the mobile device may comprise hardware devices (120) such as Input-Output (I/O) devices (e.g., a touch screen, speakers, a light-emitting diode or LED indicator, a camera, etc.), communication interface devices (e.g., a cellular interface, a Wi-Fi interface), sensors (e.g., a Global Positioning System or GPS sensor, a proximity sensor, an accelerometer, etc.), and other hardware devices. One or more device drivers in driver layer 102 hosted by one or more processors 110 of the mobile device can communicate and control the hardware devices. One or more processors 110 can execute various software programs, for example, operating system 103 running one or more application programs (e.g., web browser, address book, etc.) in applications 105 and managing one or more hardware devices via the one or more device drivers in driver layer 102. Libraries 104 can include one or more libraries used by one or more application programs in applications 105. For example, the mobile device may comprise one or more device drivers communicating with one or more touch-based input devices and detecting touch inputs. The system may comprise a touch gesture library containing touch event modules or computer program code for interpreting touch inputs detected by the device drivers to touch events or gestures. A program running on the mobile device can detect and process touch events by subscribing as listeners to touch event modules in the touch gesture library.

Figure 2:
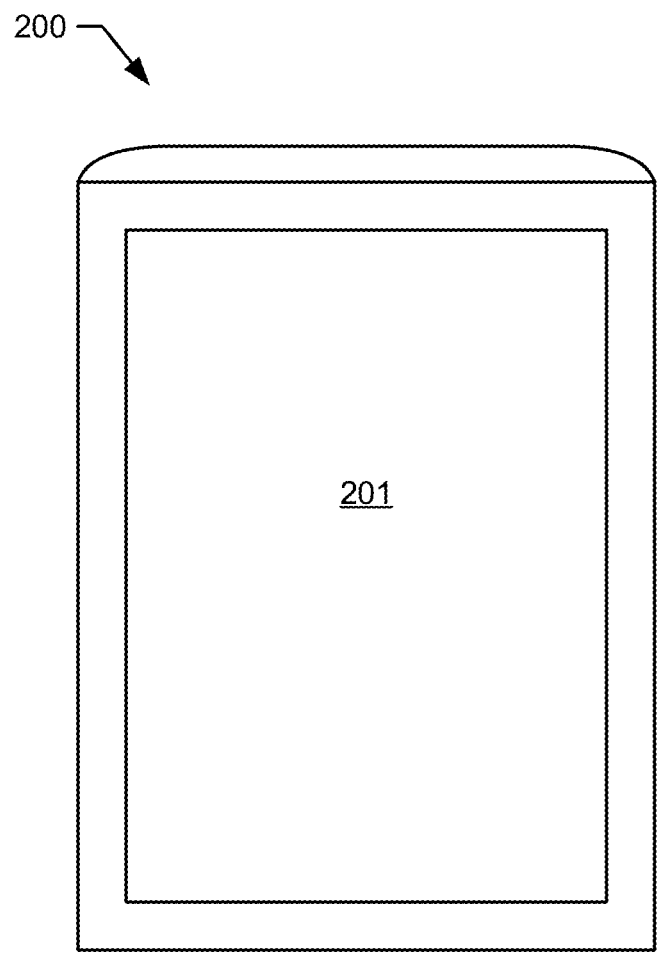
FIG. 2 illustrates an example mobile device.

FIG. 2 illustrates an example mobile device. In the example of FIG. 2, mobile device 200 may comprise a housing with a touch display 201 disposed on a front side of the housing. Touch display 201 may be a single-touch, dual-touch, or multi-touch display. Mobile device 200 may comprise a touch gesture library containing touch event modules or logic that can recognize touch inputs, and determine one or more corresponding touch events or gestures (e.g., tap, draft, swipe, pinch). One or more applications hosted by mobile device 200 may be configured to detect and respond to one or more touch events or gestures by subscribing as listeners to touch event modules in the touch gesture library.

Figure 3A:
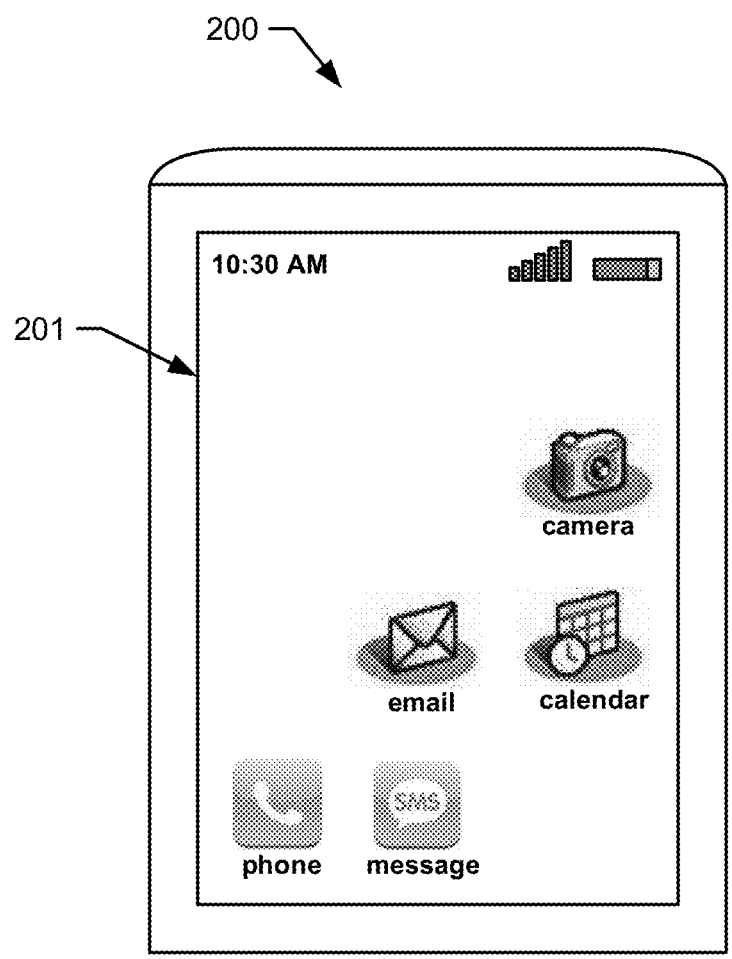
FIG. 3A illustrates an example home screen of a mobile device.

A user interface of an application running on a computing device may provide icons for user interaction with the application. A home screen is a graphical user interface of an operating system (or a shell of an operating system) running on a computing device. FIG. 3A illustrates an example home screen of mobile device 200 illustrated in FIG. 2. In the example of FIG. 3A, the home screen of mobile device 200 may encompass the entire area of touch display 201. The home screen may provide icons for user interaction with applications hosted by mobile device 200, such as a phone icon, a message icon, an email icon, a calendar icon, or a camera icon, as illustrated in FIG. 3A. In the example of FIG. 3A, a user may launch an application of mobile device 200 by tapping on an icon displayed in the home screen. For example, a user may launch an email application by tapping on the email icon displayed in the home screen. An operating system (or a shell of an operating system) may detect a single-tap touch event within the region of touch display 201 corresponding to the email icon (e.g., by subscribing as listeners to the touch event modules as described earlier), launch the email application, and display the email application's user interface within touch display 201.

Figure 3B:
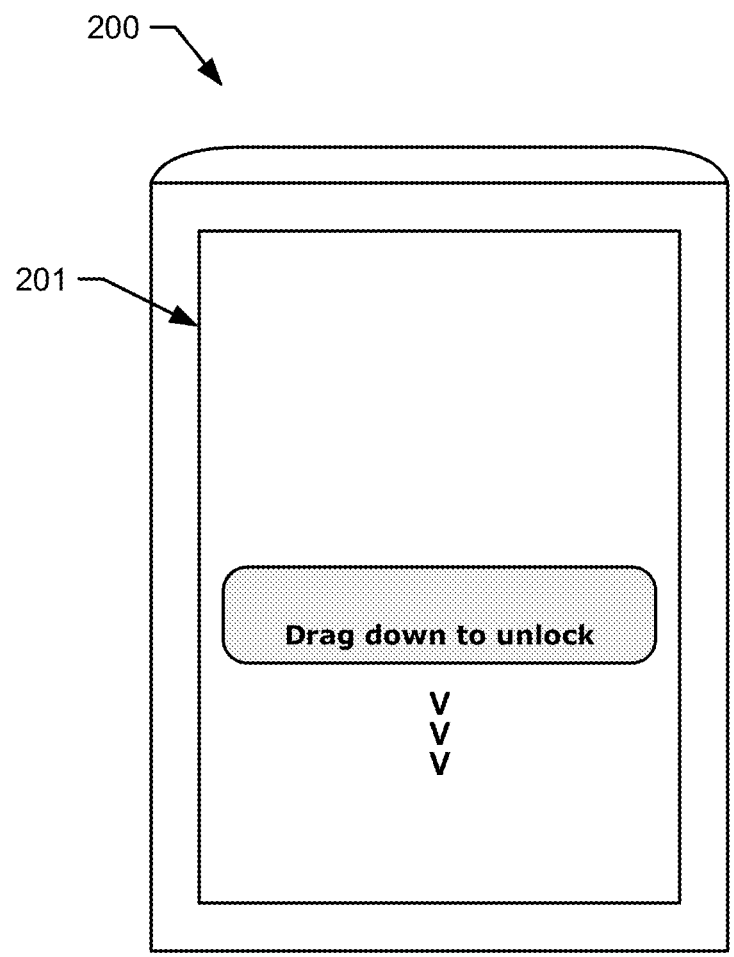
FIG. 3B illustrates an example locked screen of a mobile device.

A computing device may lock its display after a specified period of user inactivity (e.g., after one minute) for security reasons. The locked display or locked screen may prevent a user to interact with applications of the computing device. The locked screen may display one or more visual cues for a user to unlock the locked screen. For example, a locked screen of a computing device may provide a user input field for a user to enter a passcode to unlock the screen. The user may enter a passcode using a physical keyboard or a touch-screen keyboard of the computing device. For another example, a locked screen of mobile device 200 may display a bar and a text string "Drag down to unlock", as illustrated in FIG. 3B A user may perform a downward swipe touch gesture on touch display 201 to drag downward the bar and unlock the locked screen.

As described earlier, a user of a computing device may launch an application (or navigating to an application's user interface) by selecting an icon (corresponding to the application) within a home screen of the computing device. If a current user interface is not the home screen (e.g., a locked screen, or a user interface of another application), the user may first navigate from the current user interface to the home screen, then select the icon to launch the application. Particular embodiments describe methods for launching an application by a custom touch gesture. For example, particular embodiments may record and store a user's custom touch gesture for launching a particular application. Particular embodiments may detect and recognize a touch input made by the user as the custom touch gesture, and launch the particular application.

Figure 3C:
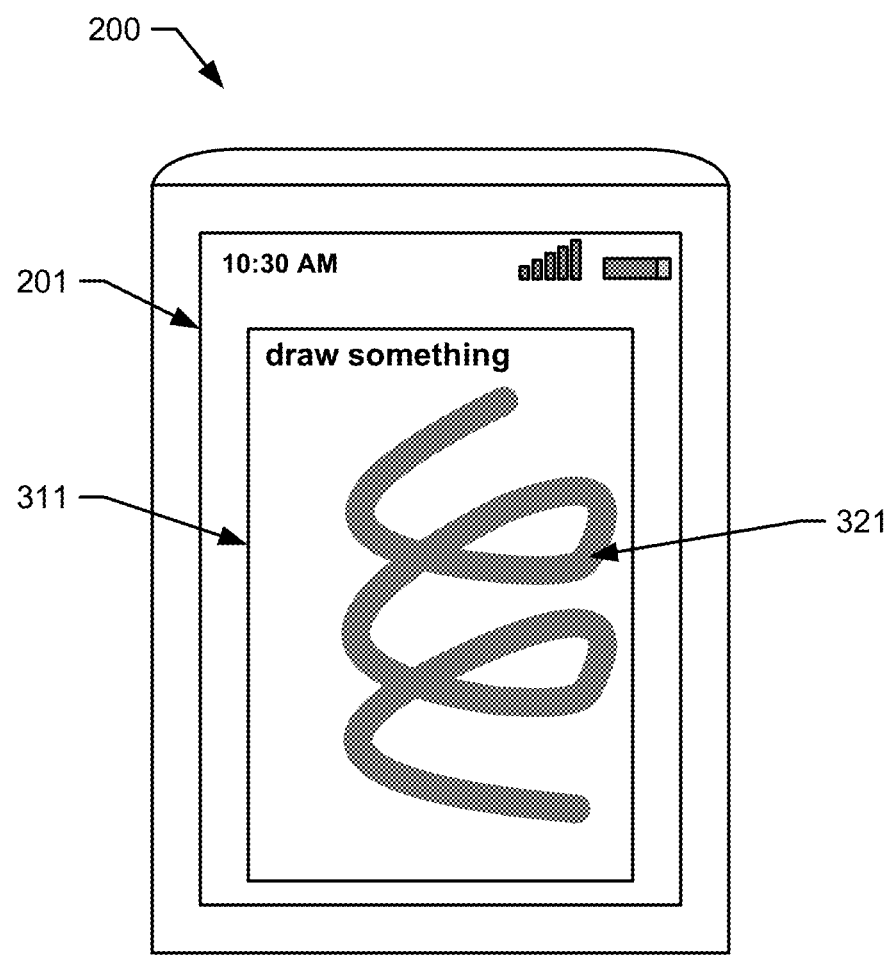
FIGS. 3C-3H illustrate example custom touch gestures.
Figure 4:
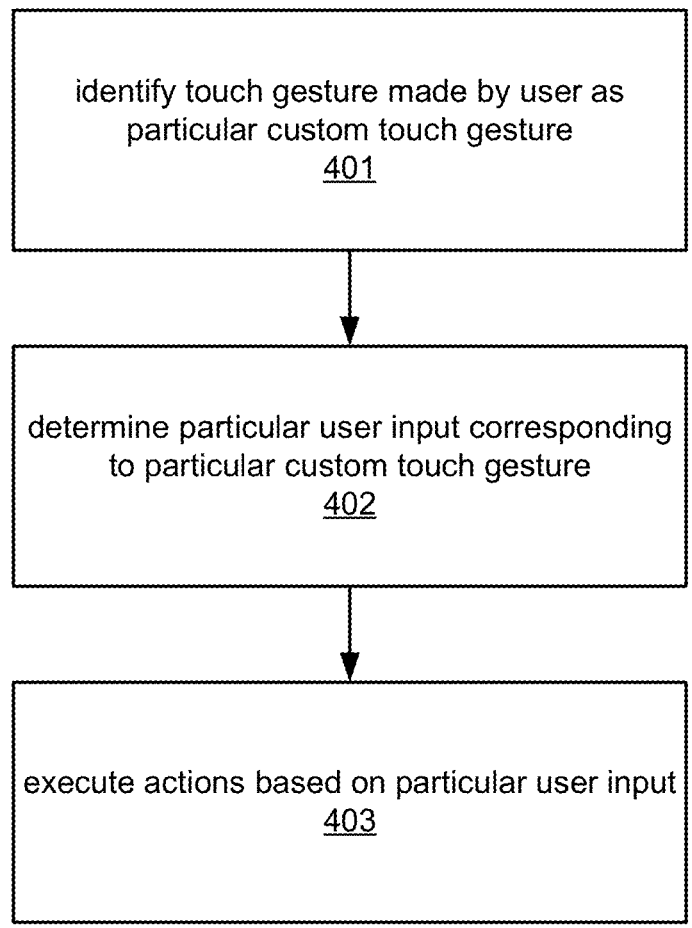
FIG. 4 illustrates an example method of providing user inputs by custom touch gestures.

FIG. 4 illustrates an example method of providing user inputs by custom touch gestures. The example method of FIG. 4 can be implemented by one or more processes hosted by one or more processors of a computing device. In particular embodiments, a computing device may be a client device with a touch-screen display. For example, a computing device may be a mobile phone, a smartphone, a tablet computer, a handheld gaming console, or any suitable computing device with a touch-screen display. For example, a computing device may be mobile device 200 with touch display 201 as illustrated in FIG. 2. In particular embodiments, a user may record and store one or more custom touch gestures in the computing device. For example, a touch gesture recording application running on mobile device 200 may present to the user a recording user interface 311 displayed in touch display 201, as illustrated in FIG. 3C. The user may perform a touch gesture (i.e., draw) within recording user interface 311. The touch gesture recording application may determine a path 321 following the user's touch gesture and display the path to provide a visual feedback to the user. The user may draw any suitable patterns within recording user interface 311 for a custom touch gesture. The user may also write letters or words in any suitable language within recording user interface 311 for a custom touch gesture.

The touch gesture recording application may determine a custom touch gesture comprising a touch trajectory (e.g., a series of points) based on the user's touch gesture performed within recording user interface 311. For example, the touch gesture recording application may use path 321 illustrated in FIG. 3C as a touch trajectory for a custom touch gesture. For another example, the recording application may ask the user to perform the touch gesture for 5 times (or any suitable number of times), and determine a touch trajectory based on a machine-learning algorithm (e.g., by using paths from the 5 touch gestures performed by the user as training data for the machine-learning algorithm).

In particular embodiments, the user may assign a recorded custom touch gestures to a particular user input. For example, after determining a custom touch gesture based on one or more touch gestures performed by the user within recording user interface 311, the touch gesture recording application may present a list of user inputs (e.g., in an overlaying frame) to the user. In response to the user's selection of a particular user input (e.g., go to a calendar application), the touch gesture recording application may assign the determined custom touch gesture to the particular user input.

Figure 3D:
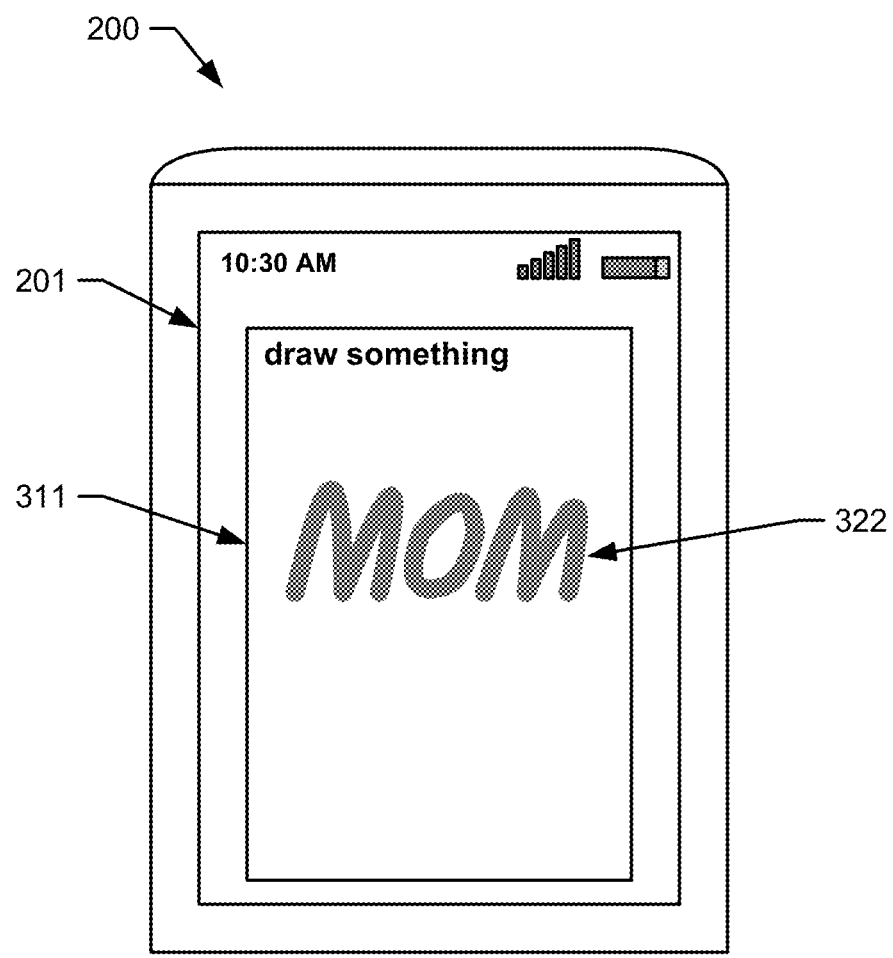
Figure 3E:
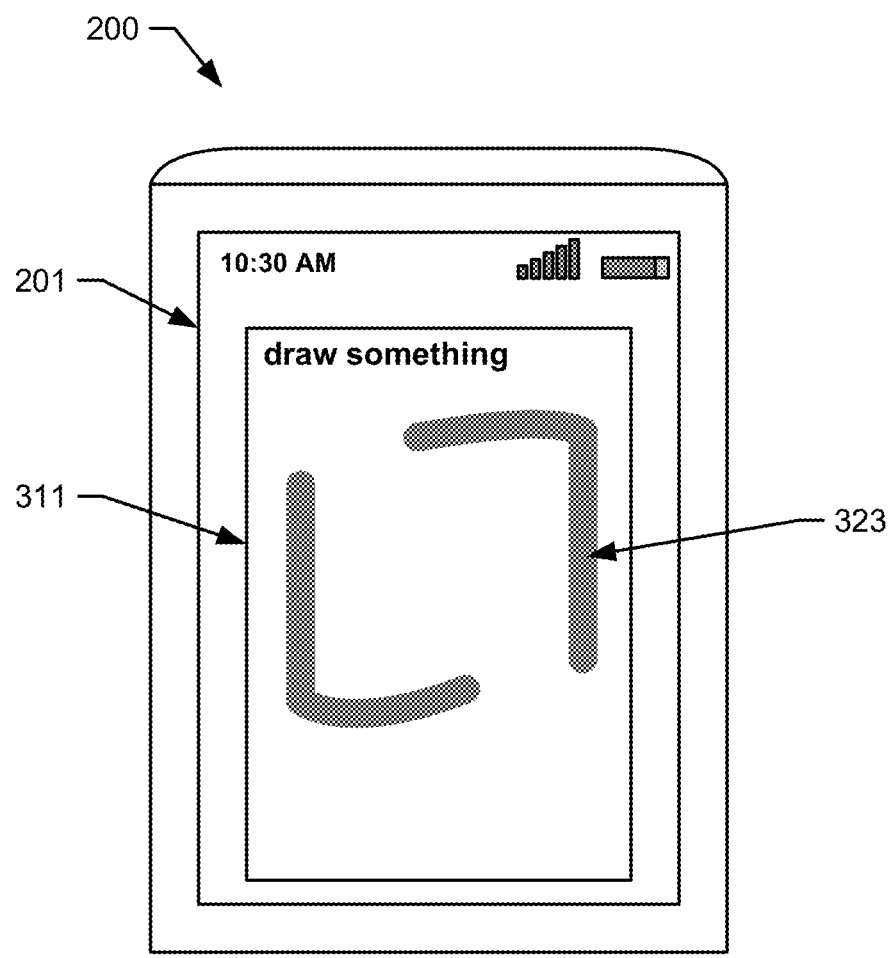

The user may assign different custom touch gestures to different user inputs. For example, the user may assign a first custom touch gesture illustrated by path 321 in FIG. 3C to a user input of going to a calendar application. For example, the user may write "mom" in recording user interface 311 (as illustrated by paths 322 in FIG. 3D), causing the touch gesture recording application to create a second custom touch gesture, and assign (based on the user's instruction) the second customer touch gesture to a user input of going to a phone application and dialing (123) 456-7890. For example, the user may draw two opposing L-shapes in recording user interface 311 (as illustrated by path 323 in FIG. 3E), causing the touch gesture recording application to create a third custom touch gesture, and assign (based on the user's instruction) the third custom touch gesture to a user input of going to a camera application. In particular embodiments, the recording application may store the one or more custom touch gestures and corresponding user inputs in touch gesture library of mobile device 200. This disclosure contemplates any suitable methods for recording and storing user custom touch gestures.

In particular embodiments, a process (of an operating system or an application) running on the computing device may identify a touch input made by a user on the computing device's touch screen as a particular one of the plurality of custom touch gestures of the user stored on the computing device (STEP 401). The user may record and store the plurality of custom touch gestures, and assign each of the plurality of custom touch gestures to a corresponding user input by using the custom gesture recording application described earlier. The process may identify the touch input as the particular custom touch gesture by subscribing as listeners to touch event modules in the touch gesture library of the computing device. In particular embodiments, the process may determine a particular user input corresponding to the particular custom touch gesture (STEP 402). For example, the process may access the touch gesture library to determine a particular user input corresponding to the particular custom touch gesturer. In particular embodiments, the process may execute (or cause the operating system to execute) one or more actions based on the particular user input (STEP 403).

Figure 3F:
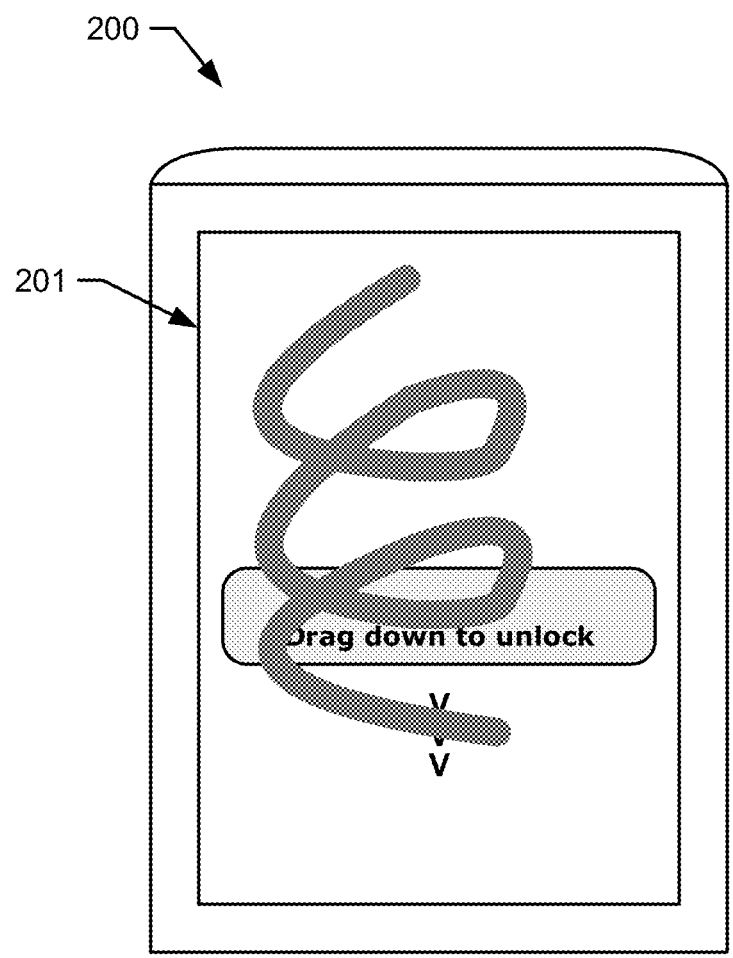

For example, a user may perform a touch input of drawing a spiral pattern on locked screen of mobile device 200, as illustrated in FIG. 3F. A process running on the computing device may detect and identify the user's touch input (on touch display 201) as a particular custom touch gesture the user recorded (as illustrated by path 321 in FIG. 3C) and determine that the particular custom touch gesture is assigned to a user input of going to a calendar application as described earlier. The process may cause an operating system (or a shell of an operating system) running on mobile device 200 to launch a calendar application and display a user interface of the calendar application, if the calendar application is not already active. If the calendar application is already running on mobile device 200, the process may cause the operating system to navigate from a user interface of the locked screen to a user interface of the calendar application. That is, instead of unlocking the locked screen first and selecting an icon for the calendar application displayed in a home screen of mobile device 200, the user may navigate from the locked screen directly to the calendar application by performing the custom touch gesture (corresponding to the calendar application) on the locked screen.

For another example, using the example method of FIG. 4, the user may write "mom" on the locked screen of mobile device 200, causing the operating system running on mobile device 200 to launch a phone application and dial (123) 456-7890, based on the custom touch gesture recorded by the user (as described earlier with FIG. 3D). For yet another example, the user may draw two opposing L-shapes on locked screen of mobile device 200, causing the operating system running on mobile device 200 to launch a camera application (e.g., displaying a view finder of the camera application in touch display 201), based on the custom touch gesture recorded by the user (as described earlier with FIG. 3E).

In particular embodiments, a user may perform a touch input as a custom touch gesture (as illustrated by the example method of FIG. 4) over any suitable user interface displayed in the computing device's touch display. For example, a user may write "mom" on a home screen of mobile device 200, or on a user interface of another application running on mobile device 200, causing an operating system running on mobile device 200 to launch a phone application and dial (123) 456-7890, based on the custom touch gesture recorded by the user (as described earlier with FIG. 3D).

Figure 3G:
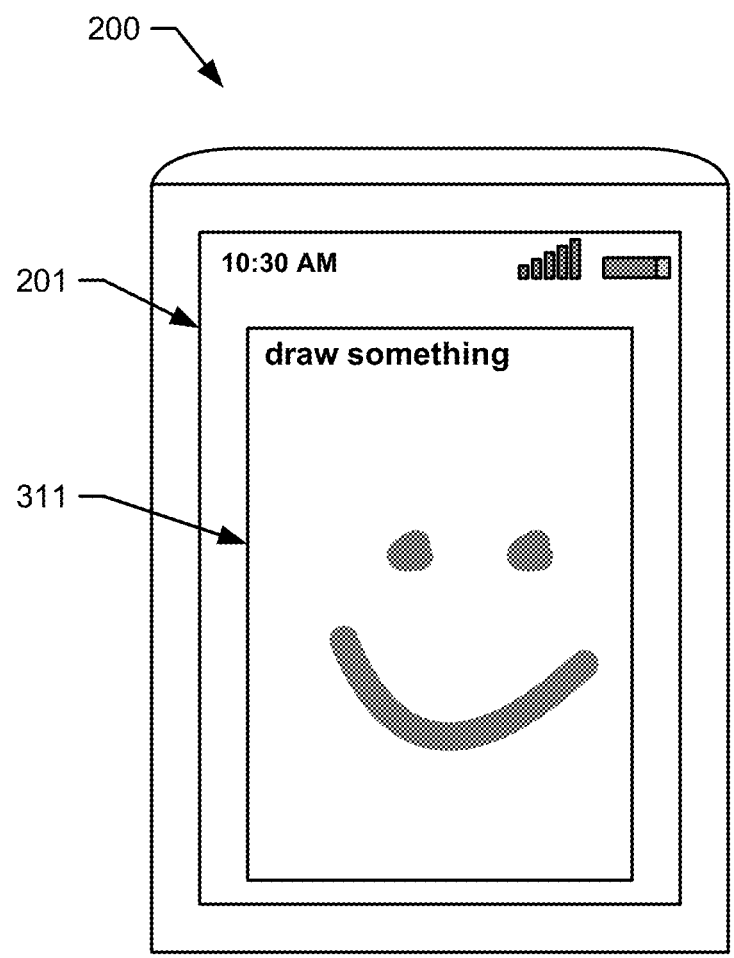
Figure 3H:
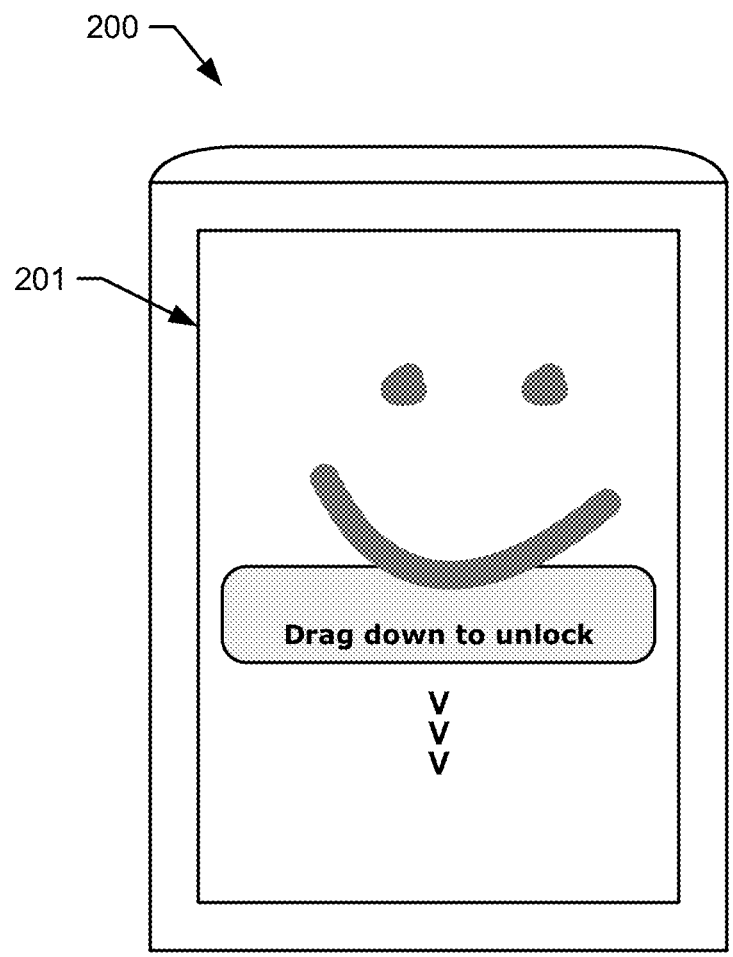

This disclosure contemplates any suitable actions caused by a custom touch gesture performed by a user as illustrated by the example method of FIG. 4. For example, a user may draw a smiley face within recording user interface 311 (as illustrated in FIG. 3G), causing the touch gesture recording application running on mobile device 200 to create a custom touch gesture, and assign (based on the user's instruction) the custom touch gesture to a user input of unlocking a locked screen. The user may perform a touch input on a locked screen displayed in touch display 201 of mobile device 200 by drawing a smiley face over the locked screen, as illustrated in FIG. 3H. A process may identify the user's touch input as a custom touch gesture corresponding to a user input of unlocking a locked screen, and unlock the locked screen (or cause another process running on mobile device 200 to unlock the locked screen). That is, particular embodiments may enable a user to define a custom touch gesture of any suitable patterns as a passcode to unlock a locked screen.

In other embodiments, a user may define a custom touch gesture to adjust a controllable parameter of an application running on the computing device, using the example method of FIG. 4. For example, a user may define (e.g., by using the custom gesture recording application described earlier) an upward arrow as a user input for turning up sound volume of a music player application of a computing device, and a downward arrow as a user input for turning down sound volume of the music player application. While the music player application is playing a music piece, the music player application may identify a user touch input performed on the computing device's touch display as the custom touch gesture of an upward arrow, determine a corresponding user input (i.e., turning down sound volume), and turn down sound volume of the music player application.

Particular embodiments may repeat the steps of the method of FIG. 4, where appropriate. Moreover, although this disclosure describes and illustrates particular steps of the method of FIG. 4 as occurring in a particular order, this disclosure contemplates any suitable steps of the method of FIG. 4 occurring in any suitable order. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

In particular embodiments, an application (or an operating system of the computing device) may store in a local storage of the computing device, a user preference file comprising user-specific data for the feature of providing user inputs by custom touch gestures as illustrated by the example method of FIG. 4. For example, a user of the computing device may turn on or off the feature of providing user inputs by custom touch gestures, causing the application to store the user's preference (e.g., the feature is turned off) in the user preference file. For example, the user preference file may comprise touch trajectories of custom touch gestures and their corresponding user inputs. In particular embodiments, the application may transmit and store the user preference file in a remote server over the Internet (i.e., the user preference file is hosted in the "cloud"). In particular embodiments, the user may access the user preference file (stored in the remote server over the Internet) from another computing device of the user. That is, the user preference file may be synchronized among some or all of the user's computing devices. For example, the user may turn off (from being turned on) the feature of providing user inputs by custom touch gestures on the user's mobile phone, causing an application of the mobile phone to store the change in the local and remote copies of the user preference file. As the user accesses the user's tablet computer, an application (or an operating system) running on the tablet computer may access the user preference file stored in the remote server and turn off the feature of providing user inputs by custom touch gestures accordingly. Although this disclosure describes or illustrates particular features being synchronized among multiple computing devices of a user, this disclosure contemplates synchronizing any suitable number of any suitable features among any suitable computing devices of the user (e.g. by using user preference files as described above). For another example, the user may acquire a new mobile phone. An application or operating system running on the new mobile phone may access the user preference file stored in the remote server for the touch trajectories and corresponding user inputs for one or more custom touch gestures from the user's existing (or previously owned) mobile phone (or another computing device). Based on touch trajectories and corresponding user inputs, the application on the new mobile phone may accurately recognize the user's custom touch gesture (and intended user inputs), without further utilizing a machine learning algorithm to record the user's custom gestures.

In some embodiments, the feature of providing user inputs by custom touch gestures (as illustrated by the example method of FIG. 4) may be turned on or off on the user's computing device based on activities of the user's social contacts in a social-networking system. For example, the feature of providing user inputs by custom touch gestures on a user's computing device may be turned on if a number of the user's social contacts within a specified social distance (e.g., two degrees or separation) having the feature of providing user inputs by custom touch gestures exceeds a specified threshold (e.g., 10). For example, a user preference file (for the feature of providing user inputs by custom touch gestures) described above may be stored with a corresponding user node in the social graph of the social-networking system. An application on a particular user's computing device may access the social graph, determine that more than 10 of the particular user's first- and second-degree friends have the feature activated (turned on) on their respective computing devices, and turn on the feature on the particular user's computing device accordingly. The application may make a suggestion (within its user interface) to the particular user about the feature, and turn on the feature based on the user's confirmation. That is, the particular user may "discover" the feature of providing user inputs by custom touch gestures, if more than 10 of his first- and second-degree friends having the feature activated on their respective computing devices. Moreover, this disclosure contemplates any suitable feature that may be turned on or off on a user's computing device based on activities of the user's social contacts in the social-networking system (e.g., by using user preference files stored in the social graph as described above). The social-networking system and social graph are described later.

A social-networking system, such as a social-networking website, may enable its users to interact with it and with each other through it. The social-networking system may create and store a record (such as a user profile) associated with the user. The user profile may include demographic information on the user, communication-channel information for the user, and personal interests of the user. The social-networking system may also create and store a record of the user's relationships with other users in the social-networking system (e.g. a social graph), as well as provide social-networking services (e.g. wall-posts, photo-sharing, or instant-messaging) to facilitate social interaction between or among users in the social-networking system.

A social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various system, including the social-networking system. For example, the user may provide his name, profile picture, city of residence, contact information (e.g., a phone number, an email address), birth date, gender, marital status, family status, employment, education background, preferences, interests, and other demographical information to be included in the user node. Each user node of the social graph may correspond to a web page (typically known as a profile page). For example, in response to a request including a user name, the social-networking system can access a user node corresponding to the user name, and construct a profile page including the name, a profile picture, and other information associated with the user. A concept node may correspond to a concept of the social-networking system. For example, a concept can represent a real-world entity, such as a movie, a song, a sports team, a celebrity, a restaurant, or a place or a location. An administrative user of a concept node corresponding to a concept may create the concept node by providing information of the concept (e.g., by filling out an online form), causing the social-networking system to create a concept node comprising information associate with the concept. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept. An edge between a pair of nodes may represent a relationship between the pair of nodes. For example, an edge between two user nodes can represent a friendship between two users. For example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in a restaurant, or the user likes a celebrity). In addition, the degree of separation between any two nodes is defined as the minimum number of hops required to traverse the social graph from one node to the other. A degree of separation between two nodes can be considered a measure of relatedness between the users or the concepts represented by the two nodes in the social graph.

A social-networking system may support a variety of applications, such as photo sharing, on-line calendars and events, instant messaging, and advertising. For example, the social-networking system may also include media sharing capabilities. For example, the social-networking system may allow users to post photographs and other multimedia files to a user's profile page (typically known as wall posts) or in a photo album, both of which may be accessible to other users of the social-networking system. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 5:
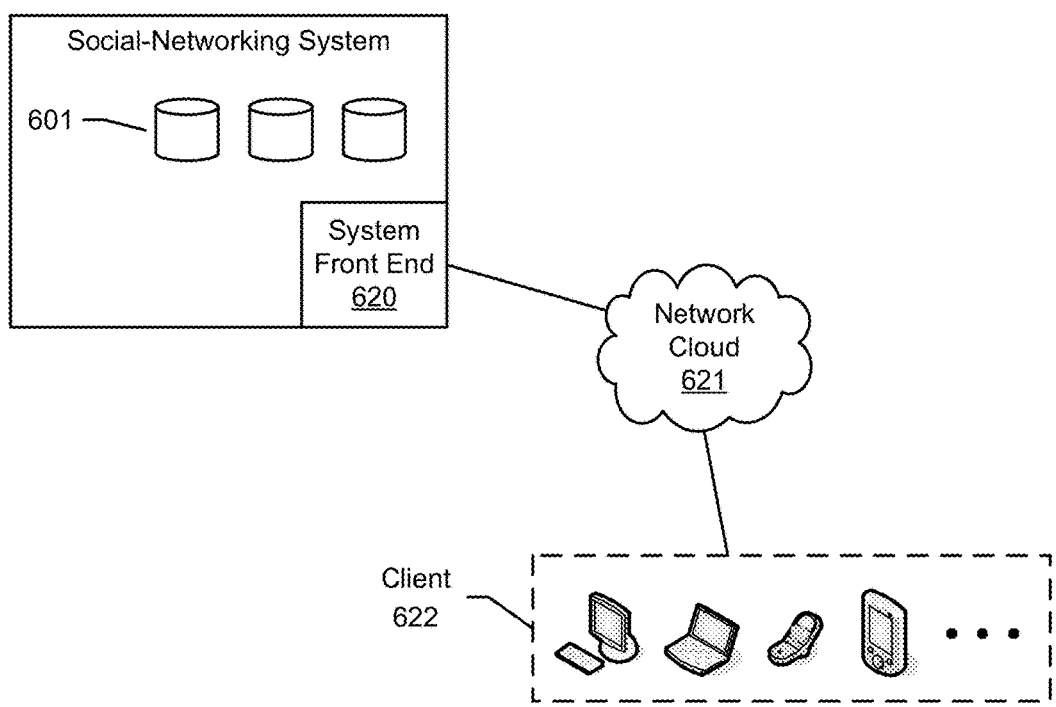
FIG. 5 illustrates an example network environment of a social-networking system.

FIG. 5 illustrates an example network environment of a social-networking system. In particular embodiments, a social-networking system may comprise one or more data stores 601. For example, each data store 601 may comprise one or more storage devices. In particular embodiments, the social-networking system may store in data stores 601 a social graph comprising user nodes, concept nodes, and edges between nodes as described earlier. Each user node may comprise one or more data objects corresponding to information associated with a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system may comprise one or more computing devices (e.g., servers) hosting functionality directed to operation of the social-networking system. In particular embodiments, one or more of data stores 601 may be operably connected to the social-networking system's front end 620. A user of the social-networking system may access the social-networking system using a client device such as client device 622. In particular embodiments, front end 620 may interact with client device 622 through network cloud 621. For example, front end 620 may be implemented in software programs hosted by one or more computing devices of the social-networking system. Front end 620 may include web or HTTP server functionality, as well as other functionality, to allow users to access the social-networking system.

Client device 622 may be a desktop computer, laptop computer, tablet computer, personal digital assistant (PDA), in- or out-of-car navigation system, smart phone or other cellular or mobile phone, or mobile gaming device, among other suitable computing devices. Client device 622 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network.

Network cloud 621 may represent a network or collection of networks (such as the Internet, a corporate intranet, a virtual private network, a local area network, a wireless local area network, a cellular network, a wide area network, a metropolitan area network, or a combination of two or more such networks) over which client devices 622 may access the social network system.

In particular embodiments, the social-networking system may store in data stores 601 data associated with applications and services provided by the social-networking system. In particular embodiments, the social-networking system may store user event data in data stores 601. For example, a user may register a new event by accessing a client application to define an event name, a time and a location, and cause the newly created event to be stored (e.g., as a concept node) in data stores 601. For example, a user may register with an existing event by accessing a client application to confirming attending the event, and cause the confirmation to be stored in data stores 601. For example, the social-networking system may store the confirmation by creating an edge in a social graph between a user node corresponding to the user and a concept node corresponding to the event, and store the edge in data stores 601.

Figure 6:
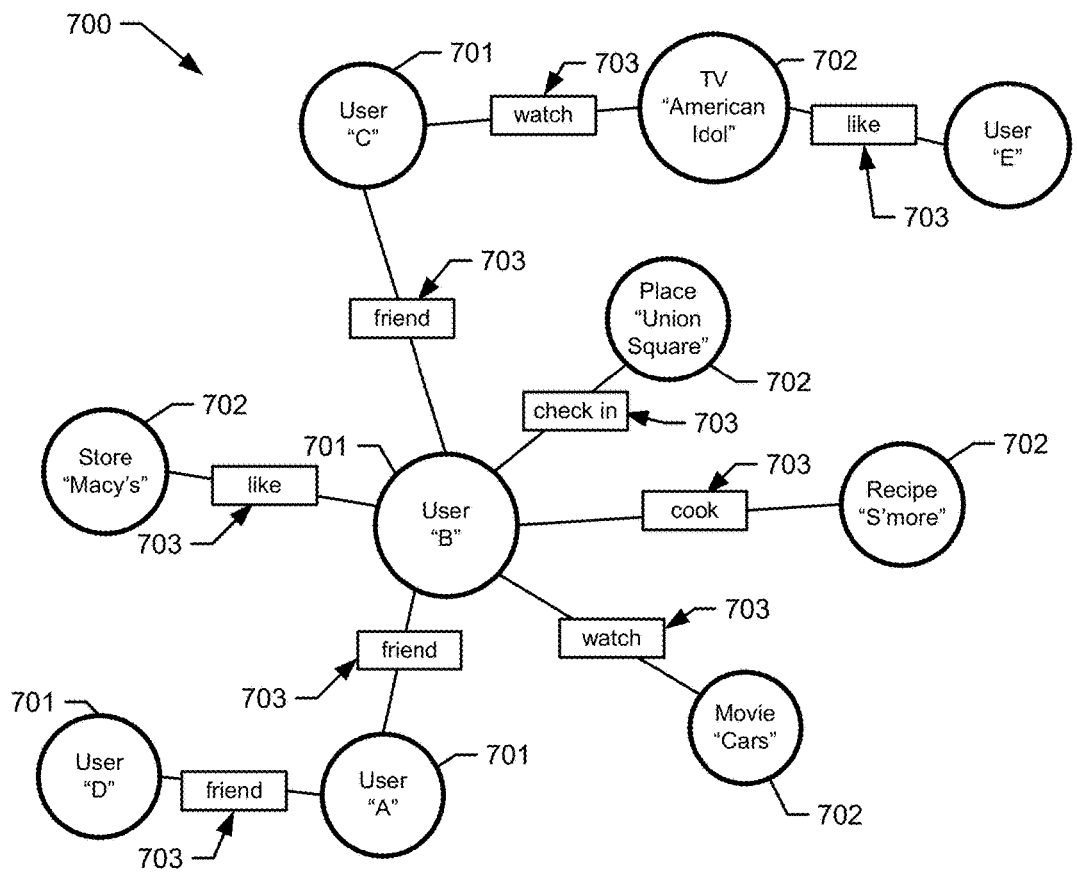
FIG. 6 illustrates an example social graph.

FIG. 6 illustrates an example social graph 700. In the example of FIG. 6, social graph 700 may include user nodes 701, concept nodes 702, and edges 703 between nodes. An edge 703 between a pair of nodes may represent a relationship (or an action) between the pair of nodes. For example, user "B" is a friend of user "A" and user "C", respectively, as illustrated by the edges between users nodes "B" and "A", and between users nodes "B" and "C." For example, users "C" watches TV show "American Idol", as illustrated by the edges between the "American Idol" concept node and user nodes "C." Similarly, the edge between the user node "B" and the concept node "Macy's" may indicate that user "B" likes "Macy's." The edge between user node "B" and the "Cars" concept node indicates that user "B" watches the movie "Cars." The edge between user node "B" and the "S'more" concept node indicates that user "B" cooks the recipe "S'more." The edge between user node "B" and the "Union Square" concept nodes indicates that user "B" checks in to "Union Square." The edge between user node "E" and the "American Idol" concept node indicates that user "E" likes TV show "American Idol." Note that a social graph can be much larger than social graph 700 illustrated in FIG. 7. For example, a social graph used by Facebook of Menlo Park, Calif. can have a number of nodes in the order of $10^8$, and a number of edges in the order of $10^{10}$.

Figure 7:
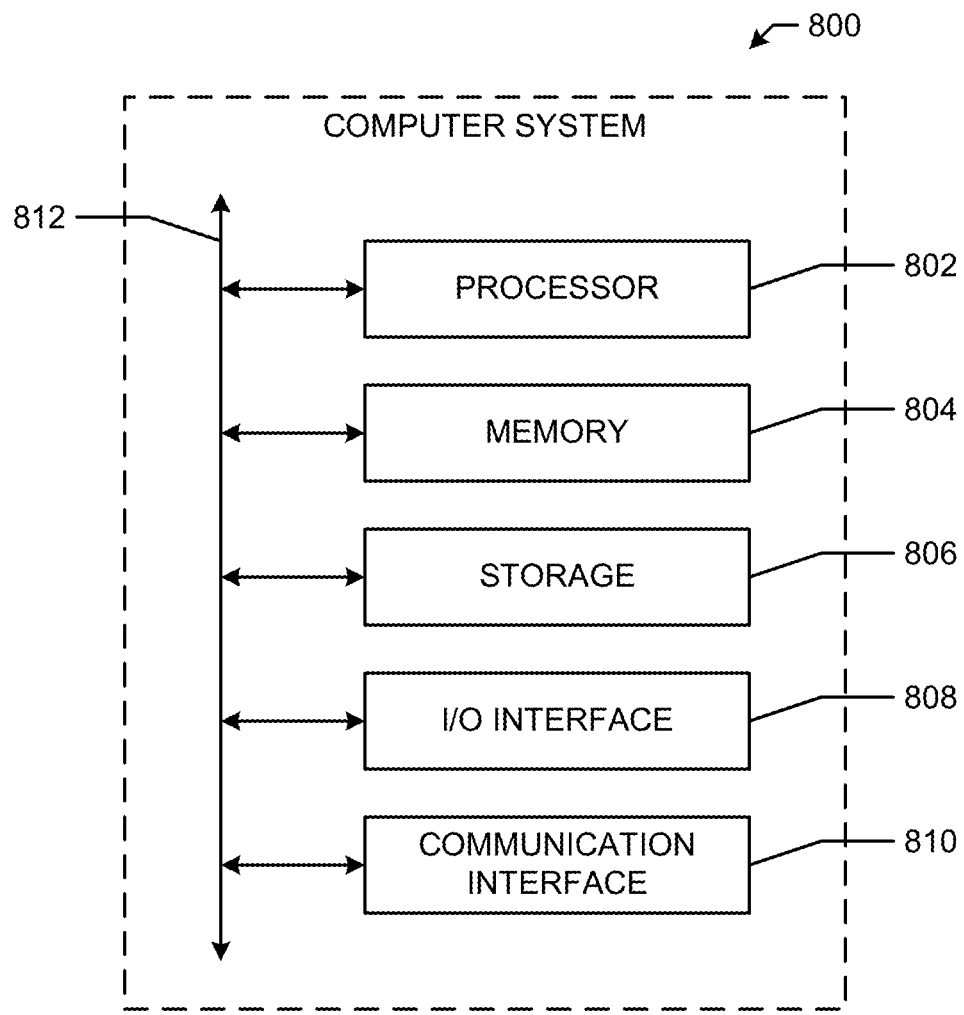
FIG. 7 illustrates an example computer system.

As described earlier, an edge between a pair of nodes may indicate a direct relationship between the pair of nodes. It is also desirable to determine likelihood of a relationship or an interest between a pair of nodes that are two or more hops away. For example, the social-working system may provide (e.g., via an email or a wall-post) a recommendation (e.g., an advertisement) for "Macy's" to user "B", given the direct relationship represented by the edge between the user node "B" and the concept node "Macy's" as illustrated in FIG. 7. The social-networking system may also provide a recommendation for "Macy's" to first-degree friends of user "B" (e.g., users "C" and "A") as first-degree friends often share comment interests.

FIG. 7 illustrates an example computer system 800, which may be used with some embodiments of the present invention. This disclosure contemplates any suitable number of computer systems 800. This disclosure contemplates computer system 800 taking any suitable physical form. As example and not by way of limitation, computer system 800 may be an embedded computer system, a system-on-chip (SOC), a desktop computer system, a mobile computer system, a game console, a mainframe, a mesh of computer systems, a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. In particular embodiments, memory 804 includes main memory for storing instructions for processor 802 to execute or data for processor 802 to operate on. As an example and not by way of limitation, computer system 800 may load instructions from storage 806 to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM).

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), or flash memory or a combination of two or more of these.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (e.g., a BLUETOOTH WPAN), a WI-FI network (e.g., a 802.11a/b/g/n WI-FI network,), a WI-MAX network, a cellular network (e.g., a Global System for Mobile Communications (GSM) network, a Long Term Evolution (LTE) network), or other suitable wireless network or a combination of two or more of these.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, or another suitable bus or a combination of two or more of these. Bus 812 may include one or more buses 812, where appropriate.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a computing device associated with a first user of a social-networking system:

accessing a social graph comprising a plurality of user nodes and a plurality of edges connecting the user nodes, each of the edges between two of the user nodes representing a single degree of social separation between them, the user nodes comprising:
a first-user node corresponding to the first user, and
a plurality of second-user nodes corresponding to a plurality of second users of the social-networking system;
identifying, based on the social graph, a set of second users corresponding to second-user nodes that are within a specified degree of social separation from the first-user node;
determining, based on the social graph, that a particular feature is enabled on computing devices associated with at least a threshold number of the identified set of second users; and
based on the determination that the particular feature is enabled on the computing devices associated with the at least threshold number of the identified set of second users, enabling the particular feature on the computing device associated with the first user.

2. The method of claim 1, further comprising sending, to the computing device associated with the first user, a notification suggesting that the first user enable the particular feature.

3. The method of claim 1, wherein the particular feature is determined to be enabled on computing devices associated with at least the threshold number of the identified set of second users, based on information from one or more user preference files of one or more second users, wherein the information from each of the user preference files is stored with the respective second-user node in the social graph.

4. The method of claim 3, wherein the user preference files are stored on a remote server associated with the social-networking system.

5. The method of claim 3, wherein the user preference files are stored in local storage of computing devices associated with the respective second users.

6. The method of claim 1, further comprising:
determining to enable the particular feature further based on activities, on an online social network associated with the social-networking system, of one or more second users corresponding to second-user nodes that are within a specified degree of social separation from the first-user node.

7. The method of claim 1, wherein the specified degree of social separation is one.

8. The method of claim 1, wherein the particular feature is a custom-touch gesture feature that executes one or more actions assigned to a custom touch gesture in response to receiving the custom touch gesture.

9. The method of claim 8, wherein the custom touch gesture is a gesture that is pre-recorded by the first user.

10. The method of claim 8, wherein one or more of the custom touch gestures comprise a touch trajectory determined based at least in part on a machine-learning algorithm.

11. The method of claim 8, wherein the actions comprise navigating from a user interface (UI) of a home or locked screen of the computing device to a UI of a particular application on the computing device.

12. The method of claim 8, wherein the actions comprise launching an application on the computing device from a shell of an operating system (OS) running on the computing device.

13. The method of claim 8, wherein the actions comprise adjusting a controllable parameter of an application on the computing device.

14. One or more computer-readable non-transitory storage media embodying software that is operable when executed to, by a computing device associated with a first user of a social-networking system:
access a social graph comprising a plurality of user nodes and a plurality of edges connecting the user nodes, each of the edges between two of the user nodes representing a single degree of social separation between them, the user nodes comprising:
a first-user node corresponding to the first user, and
a plurality of second-user nodes corresponding to a plurality of second users of the social-networking system;
identify, based on the social graph, a set of second users corresponding to second-user nodes that are within a specified degree of social separation from the first-user node;
determine, based on the social graph, that a particular feature is enabled on computing devices associated with at least a threshold number of the identified set of second users; and
based on the determination that the particular feature is enabled on the computing devices associated with the at least threshold number of the identified set of second users, enable the particular feature on the computing device associated with the first user.

15. The media of claim 14, wherein the software is further operable when executed to send, to the computing device associated with the first user, a notification suggesting that the first user enable the particular feature.

16. The media of claim 14, wherein the particular feature is determined to be enabled on computing devices associated with at least the threshold number of the identified set of second users, based on information from one or more user preference files of one or more second users, wherein the information from each of the user preference files is stored with the respective second-user node in the social graph.

17. The media of claim 16, wherein the user preference files are stored on a remote server in association with the social graph.

18. The media of claim 16, wherein the user preference files are stored in local storage of computing devices associated with the respective second users.

19. The media of claim 14, wherein the software is further operable when executed to determine to enable the particular feature further based on activities, on an online social network associated with the social-networking system, of one or more second users corresponding to second-user nodes that are within a specified degree of social separation from the first-user node.

20. A system comprising:
one or more processors; and
one or more computer-readable non-transitory storage media coupled to the processors and embodying software that is operable when executed by the processors to, by a computing device associated with a first user of a social-networking system:
access a social graph comprising a plurality of user nodes and a plurality of edges connecting the user nodes, each of the edges between two of the user nodes representing a single degree of social separation between them, the user nodes comprising:
a first-user node corresponding to the first user, and
a plurality of second-user nodes corresponding to a plurality of second users of the social-networking system;

identify, based on the social graph, a set of second users corresponding to second-user nodes that are within a specified degree of social separation from the first-user node;
determine, based on the social graph, that a particular feature is enabled on computing devices associated with at least a threshold number of the identified set of second users; and
based on the determination that the particular feature is enabled on the computing devices associated with the at least threshold number of the identified set of second users, enable the particular feature on the computing device associated with the first user.

* * * * *